Figure 1:
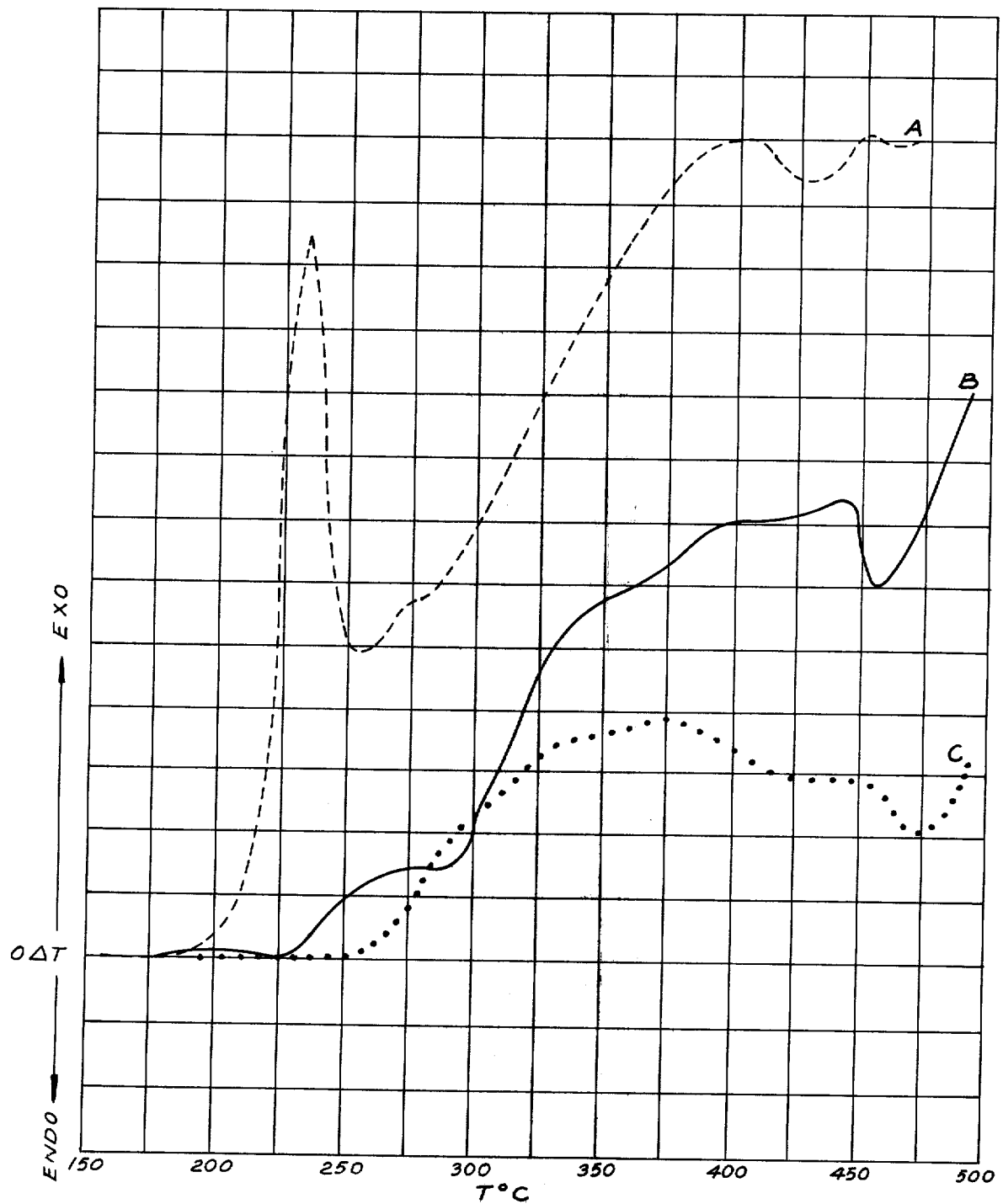

United States Patent [19]
Higginbottom

[11] 3,919,134
[45] Nov. 11, 1975

[54] THERMAL INSULATION OF MINERAL FIBER MATRIX BOUND WITH PHENOLIC RESIN

[75] Inventor: Harold P. Higginbottom, Wilbraham, Mass.

[73] Assignee: Monsanto Company, St. Louis, Mo.

[22] Filed: Apr. 10, 1974

[21] Appl. No.: 459,530

[52] U.S. Cl. .......... 260/7; 260/6; 260/38; 260/51.5; 260/839; 428/290
[51] Int. Cl.² .......... B32B 17/10; C08L 61/14; C08L 89/00
[58] Field of Search .......... 260/7, 17.2, 6, 51.5, 38, 260/839; 117/126 GB; 161/93, 198, 170

[56] References Cited
UNITED STATES PATENTS

| | | |
|---|---|---|
| 2,373,401 | 4/1945 | King .......... 260/6 |
| 2,385,374 | 9/1945 | Rhodes .......... 260/7 |
| 2,451,153 | 10/1948 | Charlton et al. .......... 260/839 |
| 3,223,668 | 12/1965 | Stalego .......... 161/198 |
| 3,616,181 | 10/1971 | Stalego .......... 161/170 |
| 3,666,694 | 5/1972 | Ingram .......... 260/7 |
| 3,823,103 | 7/1974 | Harding .......... 260/17.2 |

OTHER PUBLICATIONS
Chem. Absts., Vol. 71: (1969), 71463e, Henkel und Cie, "Molded Formaldehyde Resins Containing Mineral Fibers."

Primary Examiner—Melvin Goldstein
Assistant Examiner—Edward Woodberry
Attorney, Agent, or Firm—R. B. Blance; E. P. Grattan; J. C. Logomasini

[57] ABSTRACT

Thermal insulation with improved thermal stability and resistance to punking. The insulation comprises a matrix of mineral fiber bound with a phenolic resin. The phenolic resin is applied to the matrix as an aqueous solution or dispersion of a resole modified with dicyandiamide or melamine, and containing an alkoxymethylaminotriazine and a proteinaceous compound.

16 Claims, 1 Drawing Figure

THERMOGRAM OF DECOMPOSITION OF CURED BINDER

A. STANDARD COMMERCIAL PHENOLIC BINDER
B. STANDARD ANTIPUNKING, COMMERCIAL PHENOLIC BINDER
C. ANTIPUNKING BINDER OF PRESENT INVENTION

THERMAL INSULATION OF MINERAL FIBER MATRIX BOUND WITH PHENOLIC RESIN

BACKGROUND OF THE INVENTION

1. Field of the Invention

The present invention relates to phenol-formaldehyde liquid resin systems and to thermal insulation based on mineral fibers bonded with these resin systems.

2. Description of the Prior Art

The concept of mineral fibers bonded with phenol-formaldehyde resin was developed as a means of producing thermal insulation of low density. Such insulation is deficient in its ready susceptibility to flameless combustion or "punking" which is considered to be an autocatalytic oxidative degradation.

The art has employed various combinations of urea, melamine or dicyandiamide with phenol and formaldehyde to obtain so-called "antipunking" resins. For optimum high temperature antipunking properties, significant levels of dicyandiamide or melamine or combinations of these and a minimum combined formaldehyde are generally required. Several systems have been developed as means to achieve the desired properties.

A. Green phenolic resins obtained by limited reaction of phenol and formaldehyde, containing high concentrations of unreacted formaldehyde, which are co-reacted with dicyandiamide or melamine to solubilize the antipunk additive. Such systems require that the dicyandiamide or melamine be added to the resole while there is a high concentration of unreacted formaldehyde and, hence, unreacted phenol so that there can be sufficient reaction of dicyandiamide or melamine with formaldehyde to solubilize them. Although the excess formaldehyde reacts preferentially with the melamine or dicyandiamide, the extent of reaction must be carefully regulated to minimize reaction of resole and dicyandiamide or melamine since the reaction products reduce the water dilutability of the resin, particularly upon storage. Also, the high levels of combined formaldehyde can lower the thermal stability of the system. Moreover, pollution problems arise from unreacted phenol and formaldehyde released during the drying and curing steps;

B. Addition of either dicyandiamide or melamine as a hot aqueous solution to the preformed phenolic resin at the time of application of the resin to the mineral fiber matrix. The addition of dicyandiamide or melamine just prior to use is necessitated by the fact that these components will precipitate from solution on cooling, unless an undesirably large excess of formaldehyde is present. This approach, therefore, requires that the two components of the system be heated and combined at the time of application; and C. Antipunk or regular phenolic resins co-blended with water soluble melamine or other aminoplast resins just prior to use. Conventional technology requires blending just before use since such combinations show rapid loss in water compatibility with time. This system also requires the handling and combination of two-components. Moreover, a high concentration of melamine resin causes excessive dryness of the treated mineral fiber matrix prior to cure of binder resin, and a decrease of bonding strength and dustiness upon final cure.

Thus, there exists a need for a single aqueous phenolic resin system which contains all the necessary antipunk ingredients to confer oxidation and thermal stability upon the thermal insulation prepared from the resin system, which is stable upon storage, and which can be handled like a conventional liquid phenolic resin upon application to the mineral fiber matrix. For example, resin is generally applied from an aqueous system containing less than 8 percent solids. It is, therefore necessary for the resin to be blended with water without phase separation or formation of gummy deposits which might clog pumps, pipes and spray nozzles. Further, it is desirable that the resin should release a minimal quantity of pollutants to the atmosphere and should be free of dust formation during the drying and curing steps in the preparation of the thermal insulation.

SUMMARY OF THE INVENTION

The need is fulfilled by the present invention which provides a stable, aqueous water-dilutable phenolic resin system containing:

A. a modified resole comprising a phenol-formaldehyde condensate and a dicyandiamide-formaldehyde condensate or a melamine-formaldehyde condensate wherein the mole ratio of phenol to dicyandiamide or melamine is in the range of 1:0.20 to 1:1.2, wherein there are between 1.5 and 2.5 moles of formaldehyde per mole of phenol and, additionally, between 0.9 and 2.0 moles formaldehyde per mole of dicyandiamide or melamine, B. An etherified methylolaminotriazine wherein the degree of methylolation is at least 1.5; the degree of etherification is at least 0.5, and the etherification agent is an alcohol containing from 1 to 4 carbon atoms, and C. a proteinaceous compound soluble in aqueous media at a pH of 7 to 10;

wherein the weight ratio of the modified resole and the etherified methyloltriazine is in the range of 10:1 to 1:2 and wherein the weight ratio of proteinaceous compound to modified resole and etherified methyloltriazine is in the range of 1:1000 and 1:20.

The modified resole is prepared by condensing dicyandiamide or melamine with formaldehyde at a temperature in the range of 20°–70°C. in the presence of an alkaline aqueous solution of resole. Utilization of an advanced resole contributes to low concentrations of free phenol and formaldehyde in the system. The modified resole can be further modified with urea. The pH of the modified resole solution is adjusted to between 7 and 8 and the etherified methylolaminotriazine and the proteinaceous compound are added. The preferred methylolaminotriazines are methylolmelamines, methylolguanamines, and methylolbenzoguanamines. While the etherified methylolaminotriazine improves the antipunk behavior of the modified resole, it also acts with the proteinaceous compound to improve the stability and the water dilutability of the aqueous system.

Another aspect of the invention comprises the preparation of thermoset resins of improved thermal stability and flame retardance by drying the aqueous water-dilutable phenolic resin system and subjecting it to a temperature in the range of 200° to 500°F. for a time sufficient to thermoset the resin.

In a further aspect of the invention, a matrix of mineral fiber is treated with the diluted aqueous phenolic resin system. The matrix is dried to provide a low density non-dusting moldable thermal insulation which may be molded at temperatures in the range of 200° to 500°F. to thermoset the resin and provide shaped sections of insulation of superior thermal stability and oxidation resistance.

PREFERRED EMBODIMENTS

The phenolic resin systems of the present invention are prepared in several stages. First, a formalin solution is refluxed with phenol in the presence of an alkaline catalyst to form a resole resin. Catalysts which may be used include alkali metal hydroxides, alkaline earth metal hydroxides, tertiary amines containing between 1 to 12 carbon atoms and quaternary ammonium hydroxides containing between 1 and 12 carbon atoms. The catalyst may be added in steps to moderate the exothermic reaction. The pH is preferably in the range 8 to 10. Reaction is carried out at a temperature in the range of 50°–100°C. Excess formalin is used in the reaction which is carried out to yield a resole with a combined formaldehyde to phenol mole ratio in the range of 1.5 to 2.5. The reaction is continued until the free phenol content is less than 4%, preferably less than 2%.

The reaction mixture is cooled to a temperature preferably below 70°C. and dicyandiamide or melamine is added to give a mole ratio of initial phenol to dicyandiamide or melamine in the range of 1:20 to 1:1.2. Reaction between the dicyandiamide or melamine and the free formaldehyde in the reaction mixture is carried out until the formaldehyde concentration falls below 2 percent. The reaction temperature is in the range of 20°–70°C. The preferred range is 40°–60°C. for an adequate rate of reaction with a minimum amount of undesirable reaction products. The formalin is sufficient to provide a mole ratio of formaldehyde combined with dicyandiamide or melamine in the range of 0.9:1 to 2:1 and a mole ratio of formaldehyde combined with phenol in the range of 1.5:1 to 2.5:1. All the formalin is conveniently added at the first reaction step with phenol. Nitrogen bases such as ammonia and primary and secondary amines containing between 1 and 12 carbon atoms may be added during the reaction stage of dicyandiamide or melamine with formaldehyde and act as pH regulators, resin modifiers and formaldehyde scavengers. The amount of such base ranges between 0.1 and 10 parts by weight per 100 parts of phenol.

When the formaldehyde concentration has been reduced to less than 2 percent, the pH of the reaction mixture is adjusted to between 7 and 8 by addition of acid. The reaction is cooled and an etherified methylolaminotriazine and an aqueous solution of proteinaceous compound are added. An amber colored aqueous phenolic resin system is thus obtained. When alkaline earth metal hydroxides are used as the catalyst, they are preferably precipitated from solution prior to addition of the proteinaceous compound to avoid insolubilization of the protein. The precipitation is conveniently carried out with carbon dioxide or sulfuric acid and the insoluble carbonate or sulfate is removed by filtration or centrifugation.

The etherified methylolaminotriazines are obtained by reaction of an aminotriazine with formaldehyde to produce the methylol derivative which is then etherified with an alcohol containing from 1 to 4 carbon atoms. The degree of methylolation is at least 1.5, that is, at least 1.5 moles of formaldehyde are condensed with the aminotriazine and the degree of etherification is at least 0.5, that is, at least 0.5 moles of alcohol are reacted with one mole of methylolaminotriazine. The preferred aminotriazines are melamine, guanamine, and benzoguanamine. The weight ratio of resole modified with dicyandiamide or melamine to etherified methyloltriazine is in the range of 10:1 to 1:2. At a ratio greater than 10:1, stability of the phenolic resin system is impaired. At a ratio of less than 1:2, the phenolic resin system yields thermal insulation with low bond strength manifested by a tendency of the resin to powder and form dust.

The aqueous solution of proteinaceous compound is prepared from proteinaceous compounds which are well known to those skilled in the art. In general, the proteinaceous compounds are amphoteric but are used in aqueous solution of a pH of from 7 to 10 for addition to the phenolic resin system. The solutions may be prepared in the presence of alkali metal hydroxides and carbonates, ammonium hydroxide and water soluble aliphatic amines. It is advantageous to add urea to the proteinaceous solution as a viscosity control agent. The most commonly used proteinaceous materials are casein and soya protein. Common molecular weights range from 100,000 to 400,000. The quantity of proteinaceous compound necessary for stability of the aqueous water dilutable phenolic resin is determined by the degree of advancement of the resin. In general, a high degree of advancement requires a high concentration of proteinaceous compound. The preferred quantity of proteinaceous compound is between 0.1 and 5 weight percent of the total resin solids. Below 0.1 weight percent, the phenolic resin system loses its water emulsifiability while above 5 weight percent proteinaceous compound, the phenolic resin system exhibits impaired thermal stability.

In the application of the phenolic resin system to a matrix of mineral fiber in the preparation of thermal insulation, it is conventional to apply the resin as an aqueous solution containing less than 8 percent solids. This solids concentration required that the prior art phenolic resin systems have a water tolerance of at least 1150 percent. Water tolerance is determined at 25°C. by addition of water to the phenolic resin until a slight permanent haze forms. The tolerance is the weight of water present in the system at the haze point expressed as a percent by weight of the resin solids. Thus, where the haze point occurs when 100 parts by weight of water impart haze to 100 parts by weight of resole resin solids, the tolerance is 100 percent. It has been a feature of the prior art that in order to obtain such high levels of water tolerance, the phenolic resin systems must contain relatively green or unadvanced resin. The resin systems of the present invention are distinct in that their water tolerance may be appreciably less than 1150 percent because they form stable emulsions when they are diluted with water to solids contents of 8 percent or less.

The phenolic resin system of the present invention can be blended with urea as an inexpensive extender without loss of stability although its thermal characteristics are modified. Up to 0.7 mole urea per mole of initial phenol can be advantageously used for extending the phenolic resin system without excessive loss of thermal stability of the resin or physical strength of the insulation prepared from the resin.

The following examples are set forth to illustrate more clearly the principles and practices of this invention to one skilled in the art. They are not intended to be restrictive but merely to be illustrative of the inven-

EXAMPLE 1

This example sets forth the preparation of an aqueous phenolic resin system of the present invention.

Phenol (1.00 moles), 50 percent formalin (3.20 moles) and alkaline metal hydroxide catalyst (0.10 mole) are reacted at 70°C. until the concentration of formaldehyde drops to 9 weight percent. The reaction mixture is cooled below 60°C. and dicyandiamide (0.55 moles) is added and reacted for 20 minutes. Urea (0.16 moles) and 28% ammonia (0.066 moles $NH_3$) are added. The reaction mixture is held at about 50°C. for 20 minutes and is then neutralized to a pH of 7.8 to 8.0. Methoxymethylmelamine (65% aqueous solution, degree of methylolation 3.8, degree of etherification 2.0) and soya protein solution (20% in protein solids) are added in succession to the reaction mixture and blended with it. The solids ratio of resole to methoxymethylmelamine to protein is 1000:338:12. A clear amber colored fluid with a solids content of 60%, a free formaldehyde content less than 1% and a free phenol content of about 0.5% is obtained. The water tolerance of the fresh product is about 800 percent. A stable dispersion forms when water is added in excess of the water tolerance.

Premixing of the soya protein is accomplished as follows: Urea (30 parts) is dissolved in water (48.5 parts) and soya protein (20 parts) is added and slurried. After 30 minutes, ammonia solution (1.5 parts) is added and allowed to mix for 30 minutes. The appropriate amount of solution is then added to the resin.

The resin which results from this example can be shipped and stored as a single package. On storage for one to 2 months at a temperature in the range of 0° to 18°C., there is no phase separation or precipitation of insoluble material. While the water tolerance decreases slightly, the resin retains its emulsifiability, yielding stable dispersions when water in excess of the water tolerance is added.

In contrast, when the methoxymethylmelamine is omitted from the aqueous phenolic resin system, and the resin is stored at a temperature in the range of 0°–18°C., crystalline deposits appear overnight. The deposits tend to clog pumps and block spray nozzles when the resin is sprayed on mineral fiber matrices. Within 1 week, the crystalline deposits increase to such an extent that spray application becomes impossible.

EXAMPLE 2

The procedure and starting materials of Example 1 are repeated except that casein replaces the soya protein as the emulsifier. The properties of the resin product are essentially indistinguishable from those of Example 1.

EXAMPLE 3

The procedure of Example 1 is repeated with the same starting materials except that the methoxymethylmelamine has a degree of methylolation of 2.5 and a degree of etherification of 1.0. The weight ratio of modified resole to etherified methyloltriazine to protein is 1000:340:12. The product has a solids content of 60%, a free formaldehyde content of below 1%, and a free phenol content of 0.48%.

EXAMPLE 4

This example sets forth the preparation of an aqueous phenolic resin with a higher dicyandiamide content than Example 1. The procedure of Example 1 is followed except that 0.0875 moles of alkali metal hydroxide catalyst is used, the dicyandiamide content is raised to 0.64 moles and no ammonia addition is made. The solids ratio of resole to methoxymethylmelamine to protein for this example is 1000:344:12. The resin solution has a solids content of 60%, a free formaldehyde content of 0.75%, and a phenol content of 0.54%. The water tolerance is about 700 percent.

EXAMPLE 5

This example sets forth the preparation of an aqueous phenolic resin with a higher urea content than Example 1. The procedure of Example 1 is repeated except that the dicyandiamide is added when the concentration of unreacted formaldehyde has fallen to 10 weight percent. Prilled urea (0.64 moles) is added but no ammonia addition is made. The reaction is neutralized to a pH of 7.4. The methoxymethylmelamine and soya protein solution are mixed in. The solids ratio of resole to methoxymethylmelamine to protein is 1000:542:11. The resin has a free formaldehyde content below 1% and a free phenol content of about 0.5%. The water tolerance of the fresh product is about 900 percent. A stable dispersion results when water in excess of the water tolerance is added. The product resin has a solids content of about 63%.

EXAMPLE 6

This example sets forth the preparation of an aqueous phenolic resin with a high methoxymethylmelamine content. The procedure of Example 1 is repeated except that the dicyandiamide is added when the concentration of unreacted formaldehyde has fallen to 7 weight percent. No ammonia or urea are added. After pH adjustment of the resin, a methoxymethylmelamine (65% solids, degree of methylolation 2.5, degree of etherification 1.0) is added. The solids ratio of resole to methoxymethylmelamine to proteinaceous compound is 1000:1600:13.

A clear amber colored fluid with a solids content of 63%, a free formaldehyde content of 0.5% and a free phenol content of about 0.5% is obtained. The water tolerance of the fresh product is about 600 percent. A stable dispersion results when water is added in excess of the water tolerance.

EXAMPLE 7

This example sets forth the preparation of an aqueous phenolic resin containing a low ratio of dicyandiamide to phenol. The procedure outlined in Example 1 is repeated except that the dicyandiamide (0.28 moles) is added when the concentration of unreacted formaldehyde has fallen to 6 weight percent. Urea (0.48 moles) is added as indicated in Example 1. No ammonia is added in this example. The product is neutralized to a pH of 7.6–7.8. The solids ratio of resole to methoxymethylmelamine to protein is 1000:1033:18. The water tolerance of the fresh product is about 600 percent. A stable dispersion forms when water in excess of the water tolerance is added. The resin has a total solids content of about 62.5%. The free formaldehyde content is below 1% and free phenol content is below 0.5%. No phase separation or precipitation of insoluble material occurs when the resin is stored at temperatures in the range of 0°–18°C. for 1 to 2 months.

EXAMPLE 8

This example sets forth the preparation of an aqueous phenolic resin with melamine in place of dicyandiamide. The procedure of Example 1 is repeated except that melamine (0.45 moles) is added in place of dicyandiamide. No ammonia is added in this Example. The product is neutralized to a pH of 7.8 to 8.0. The solids ratio of modified resole to methoxyethylamine to protein is 1000:342:12. The storage stable resin which results from this example has a solids content of approximately 60%, a free formaldehyde content below 1%, a free phenol content of about 0.5%, and a water tolerance of 500 percent.

EXAMPLES 9–11

These examples set forth the preparation of aqueous phenolic resins containing higher alkyl ethers of methylolmelamine. The procedure of Example 1 is followed except that in Example 10 ethoxymethylmelamine with degree of methylolation 5.8 and degree of ethylation 3.0 is used in place of methoxymethylmelamine; in Example 11, n-propoxymethylmelamine with degree of methylolation 5.8 and degree of propylation 2.0 is used; and in Example 12, n-butoxymethylmelamine with degree of methylolation 5.8 and degree of butylation 2.0 is used. The phenolic resin products have water tolerances of approximately 200 and exhibit good storage stability.

EXAMPLE 12

The procedure of Example 1 is followed except that the methoxymethylmelamine is replaced with methoxymethylguanamine of degree of methylolation 3.8 and degree of methylation 2.0. The phenolic resin product has a water tolerance of approximately 500 and exhibits good storage stability.

EXAMPLE 13

The procedure of Example 1 is followed except that the methoxymethylmelamine is replaced with methoxymethylbenzoguanamine of degree of methylolation of 3.8 and degree of methylation of 1.0. The phenolic resin product has a water tolerance of approximately 500 and exhibits good storage stability.

EXAMPLE 14

MIX STABILITY TEST

To demonstrate the instability of conventional antipunk phenolic resins blended with methoxymethylmelamine resins, the following experiment was devised. A conventional antipunk phenolic resin was blended with methoxymethylmelamine (65% solids, degree of methylolation 2.5, degree of etherification 1.0). The ratio of phenolic resin solids to melamine resin solids was 3:1. The individual resins and the blend possessed infinite water tolerance initially (>10,000%). The resins and the blend were stored at 23°C. and their water tolerance was determined over a period of time. The data are presented in Table 1.

TABLE 1

CHANGE IN WATER TOLERANCE OF RESINS

| RESIN | WATER TOLERANCE, % (days at 23°C.) | | | | |
|---|---|---|---|---|---|
| | (0) | (4) | (6) | (8) | (11) |
| 1. Conventional antipunk phenolic liquid resin | >10,000 | 6,360 | 5,702 | 2,412 | 1,316 |
| 2. Methoxymethylmelamine resin (degree of methylolation 2.5, degree of etherification 1.0) | >10,000 | >10,000 | >10,000 | >10,000 | >10,000 |
| 3. 3:1 blend of resins 1 and 2 | >10,000 | 1,678 | 1,119 | 746 | 466 |
| 4. Resin of Example 1 | 800 | — | — | — | 500 |

The data show that a sharp decrease in water tolerance of the blend occurs. Within 11 days, the water tolerance is less than 5% of the initial value. Indeed, the blend becomes unsuitable for dilution and problem-free processing in a conventional insulation manufacturing process after about 4 days. Under the same aging conditions, the resin of Example 1 of the present invention retains more than 50% of its initial water tolerance and shows no change in emulsifiability and processability for periods beyond 14 days.

EVALUATION OF THERMAL INSULATION RESINS

Thermal insulation is prepared by applying the phenolic resin system of the present invention to a matrix of mineral fiber. The preferred fiber is glass. For example, the phenolic resin system is diluted with water to form a solution of dispersion containing between 2 and 25 percent solids. The aqueous dispersion or solution is applied to a matrix of glass fibers in an amount sufficient to yield a matrix containing from about 2 to about 15 percent by weight of cured resin. The matrix is subjected to drying conditions by forcing a volume of air heated at 100°F. through the matrix for a period of three minutes. The dried matrix is placed in a mold and cured for 2 minutes at 400°F. In another method of preparing thermal insulation, the diluted solution or dispersion is sprayed onto glass fibers immediately after the fibers have been formed and while they are falling through the air onto a conveyor to form a mat. The mat is then advanced on the conveyor compressed against another conveyor to the required density and is heated to a temperature in the range of 400°–500°F.

The resins of the present invention have outstanding application characteristics and efficiency. The smaller quantity of volatile organic material liberated during drying and curing of the impregnated matrix decreases atmospheric pollution. The binder composition can be formulated with silanes and lubricants to gain property benefits well known to the art. The disclosed binders can be cured at temperatures normally used for thermal insulation manufacture (200° to 400°F.) to produce insulation with outstanding antipunking properties. However, optimum antipunking and thermal stability are obtained with insulation manufactured from the disclosed binders by initial cure or post-cure at temperatures in the range of 400° to 500°F.

HOT BALL PUNKING TEST

Glass fiber thermal insulation test samples of one inch thickness, approximately 2 pounds per cubic foot density and containing 12 percent by weight of the binder cured at a temperature of 350°F. are prepared. Six 4 × 4 × 1 inch test samples are cut from each insulation piece to be tested. The six pieces are stacked vertically to form a 4 × 4 × 6 inches composite. A one-half inch diameter steel ball is heated to 1400°F. in a muffle furnace. The test is conducted by separating the six-ply stack of test samples between the third and fourth samples, placing the heated ball bearing at the exact center between the third and fourth sample, reforming the 4 × 4 × 6 inches composite and immediately compressing the composite in the vertical direction from 6 to 3 inches in height.

The composite is held under compression for twenty minutes or until punking has subsided. The test pieces are then released from compression, opened between the third and fourth mat and the ball bearing removed. The darkened and decomposed area surround the ball on the 4 inch square face is then measured. The percent punking is defined as:

$$\% \text{ punking} = \frac{\text{Area decomposed} - \text{Area of ball bearing}}{\text{Area of 4 inch face} - \text{Area of ball bearing}}$$

$$\% \text{ Punking} = \frac{\text{Area decomposed} - 0.196}{15.804}$$

By this test, the following comparative results are obtained:

| BINDER SYSTEM | % Punking |
|---|---|
| General purpose commercial phenolic resin | 100 |
| General purpose commercial antipunk resin | 21.2 |
| Phenolic resin of Example 1 | 9.9 |

HOT PLATE TEST

Glass fiber thermal insulation having 2 inch thickness, a density of 3.5 pounds per cubic feet and containing 9–11 percent cured binder content is prepared. Samples of the insulation are placed on the surface of a hot plate at 650°F. for 2 hours and then they are removed and examined. Samples made with the resin of Example 1 show negligible surface degradation with no evidence of punking into the mat. Conventional general purpose antipunk binders give insulation samples which show significantly more surface degradation and some punking into the mat. Sample mats containing general purpose phenolic resins which are not antipunking in nature show destructive decomposition of the resin and extensive punking within the body of the insulation mat.

PIPE INSULATION TEST

A sample of the resin of Example 1 is diluted with water to 18 percent solids. The aqueous resin is sprayed onto a matrix of glass fibers to give a mat containing about 8 percent by weight of cured resin. The mat is subjected to drying conditions by forcing a volume of air heated at 100°F. through it for a period of 3 minutes. The dried mat is placed in a mold and cured for 2 minutes at 400°F. to form semi-cylindrical sections of 2 inch thickness, 3 feet in length and having an interior diameter of 2 inches. The sections are applied to the exterior of a 2 inch diameter iron pipe and wound with asbestos-treated canvas and clamped. When the pipe is subjected to interior temperatures up to 600°F. the material does not exhibit punking or lose its insulation properties.

DIFFERENTIAL SCANNING CALORIMETRY (DSC) EVALUATION OF BONDING RESINS

In order to compare the exothermic decomposition of the example resins of this application and prior art resins, differential scanning calorimetry (DSC) data was obtained. A standard duPont 900 Differential Thermal Analyzer equipped with a differential scanning calorimetry cell was employed. DSC allows a quantitative measure of the heat evolved when resin decomposition occurs. Samples for comparison are prepared by curing binders under conditions similar to those that would be encountered in a thermal insulation process but without the fiber substrate being present. The cured binder is ground to a uniform particle size to pass through a 100–140 mesh size. The exothermic decomposition of 10.0 mg. samples is determined in a static atmosphere of air. The rate of heating is 30°C. per minute over the temperature range of 25°C. to 500°C.

The thermogram in FIG. 1 illustrates the comparative decomposition exotherms of commercial prior art resins fo the anti-punking and non-antipunking type compared with products of this invention. Curve A is the thermogram of a standard commercial type of phenol-formaldehyde resin (non-antipunking). It shows a pronounced exotherm at 230°C. followed by a broad massive exotherm from 250°C. to over 500°C. The exotherm at 230°C. is regarded as the mechanism triggering punking. The broad exotherm caused by oxidative decomposition above 250°C. provides the destructive heat that builds within the insulation and causes uncontrolled punking. The thermogram of the decomposition of a commercial general purpose antipunk resin is shown in Curve B. In comparison with Curve A, the triggering exotherm at 230°C. and the general exotherm in the 250°–500°C. region is substantially reduced. The thermogram of the decomposition of a resin of the present invention, the resin of Example 3, is shown in Curve C. The triggering exotherm at 230°C. is eliminated and the general exothermic decomposition in the 250° to 500°C. region is reduced to a low level. The exotherm illustrated by Curve C is controlled by varying the dicyandiamide or melamine content, the urea content and the etherified methylol aminotriazine content of the aqueous phenolic resin within the scope of the invention. A decrease in the exotherm is generally observed when the concentration of any of these components is increased.

From the foregoing, it is obvious that many variations are possible in the practice of the invention, without departing from the spirit and scope thereof.

What is claimed is:

1. A thermal insulation comprising mineral fibers bonded with a phenolic resin system which comprises:
   A. a modified resole comprising a phenol-formaldehyde condensate and a dicyandiamide-formaldehyde or a melamineformaldehyde condensate wherein the mole ratio of phenol to dicyandiamide or melamine is in the range of 1:0.2 to 1:1.2, wherein there are between 1.5 and 2.5 moles of formaldehyde per mole of phenol, and, additionally, between 0.9 and 2.0 moles formaldehyde per mole of dicyandiamide or melamine, B. an etherified methylolaminotriazine wherein the degree of methylolation is at least 1.5; the degree of etherification is at least 0.5 and the etherification agent is an alcohol containing from 1 to 4 carbon atoms, and C. a proteinaceous compound soluble in aqueous media at a pH of 7 to 10;

wherein the weight ratio of the modified resole to the etherified methylolaminotriazine is in the range of 10:1 to 1:2 and wherein the weight ratio of the proteinaceous compound to the modified resole and the etherified methylolaminotriazine is in the range of 1:1000 to 1:20.

2. The thermal insulation of claim 1 wherein the methylolaminotriazine is selected from the group consisting of methylolmelamines, methylolguanamines and methylolbenzoguanamines.

3. The thermal insulation of claim 1 wherein methylolaminotriazine is a methylolmelamine and the alcohol is methyl alcohol.

4. The thermal insulation of claim 1 wherein the proteinaceous compound is casein.

5. The thermal insulation of claim 1 wherein the proteinaceous compound is soya protein.

6. The thermal insulation of claim 1 wherein the phenolic resin system comprises additionally up to 0.7 mole urea per mole of phenol.

7. The thermal insulation of claim 1 wherein the mineral fibers are glass.

8. A thermal insulation comprising mineral fibers bonded with a phenolic resin system which comprises:

A. a modified resole comprising a phenol-formaldehyde condensate and a dicyandiamide-formaldehyde condensate wherein the mole ratio of phenol to dicyandiamide is in the range of 1:0.2 to 1:1.2, wherein there are between 1.5 and 2.5 moles of formaldehyde per mole of phenol, and, additionally, between 0.9 and 2.0 moles formaldehyde per mole of dicyandiamide, B. a methoxymethylmelamine wherein the degree of methylolation is at least 1.5 and the degree of methylation is at least 0.5, and C. a proteinaceous compound selected from the group consisting of casein and soya protein;

wherein the weight ratio of the modified resole to the methoxymethylmelamine is in the range of 10:1 to 1:2 and wherein the weight ratio of the proteinaceous compound to the modified resole and the methoxymethylmelamine is in the range of 1:1000 to 1:20.

9. A process for preparing thermal insulation which comprises:

A. applying to a matrix of mineral fiber an aqueous phenolic resin system comprising:

1. a modified resole comprising a phenol-formaldehyde condensate and a dicyandiamide-formaldehyde or melamine-formaldehyde condensate wherein the mole ratio of phenol to dicyandiamide or melamine is in the range of 1:0.2 to 1:1.2, wherein there are between 1.5 and 2.5 moles of formaldehyde per mole of phenol, and, additionally, between 0.9 and 2.0 moles formaldehyde per mole of dicyandiamide or melamine, 2. an etherified methylolaminotriazine wherein the degree of methylolation is at least 1.5; the degree of etherification is at least 0.5, and the etherification agent is an alcohol containing from 1 to 4 carbon atoms, and 3. a proteinaceous compound soluble in aqueous media at a pH of 7 to 10, wherein the weight ratio of the modified resole to the etherified methylolaminotriazine is in the range of 10:1 to 1:2 and wherein the weight ratio of the proteinaceous compound to the modified resole and the etherified methylolaminotriazine is in the range of 1:1000 to 1:20;

B. drying the matrix of mineral fiber; and

C. heating the matrix at a temperature in the range of 200°–500°F. to cure the phenolic resin.

10. The process of claim 9 wherein the methylolaminotriazine is selected from the group consisting of methylolmelamines, methylolguanamines and methylolbenzoguanamines.

11. The process of claim 9 wherein methylolaminotriazine is a methylolmelamine and the alcohol is methyl alcohol.

12. The process of claim 9 wherein the proteinaceous compound is casein.

13. The process of claim 9 wherein the proteinaceous compound is soya protein.

14. The process of claim 9 wherein the aqueous phenolic resin system additionally comprises up to 0.7 mole urea per mole of phenol.

15. The process of claim 9 wherein the mineral fiber is glass.

16. A process for preparing thermal insulation which comprises:

A. applying to a matrix of mineral fiber an aqueous phenolic resin comprising:

1. a modified resole comprising a phenol-formaldehyde condensate and a dicyandiamide-formaldehyde condensate wherein the mole ratio of phenol to dicyandiamide is in the range of 1:0.2 and 1:1.2, wherein there are between 1.5 and 2.5 moles of formaldehyde per mole of phenol, and, additionally, between 0.9 and 2.0 moles formaldehyde per mole of dicyandiamide, 2. a methoxymethylmelamine wherein the degree of methylolation is at least 1.5 and the degree of methylation is at least 0.5, and 3. a proteinaceous compound selected from the group consisting of casein and soya protein, wherein the weight ratio of the modified resole to the methoxymethylmelamine is in the range of 10:1 to 1:2 and wherein the weight ratio of the proteinaceous compound to the modified resole and the methoxymethylmelamine is in the range of 1:1000 to 1:20;

B. drying the matrix of mineral fiber; and

C. heating the matrix at a temperature in the range of 400°–500°F. to cure the phenolic resin.

* * * * *